United States Patent
Hong

(10) Patent No.: US 11,229,842 B2
(45) Date of Patent: Jan. 25, 2022

(54) METHOD AND APPARATUS FOR SYNCHRONOUSLY PLAYING ANIMATION, STORAGE MEDIUM, AND ELECTRONIC APPARATUS

(71) Applicant: TENCENT TECHNOLOGY (SHENZHEN) COMPANY LIMITED, Shenzhen (CN)

(72) Inventor: Yirong Hong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 267 days.

(21) Appl. No.: 16/583,179

(22) Filed: Sep. 25, 2019

(65) Prior Publication Data

US 2020/0016489 A1   Jan. 16, 2020

Related U.S. Application Data

(63) Continuation of application No. PCT/CN2018/110566, filed on Oct. 17, 2018.

(30) Foreign Application Priority Data

Oct. 17, 2017 (CN) .......................... 201710967202.7

(51) Int. Cl.
 *A63F 13/52* (2014.01)
 *A63F 13/335* (2014.01)
 (Continued)

(52) U.S. Cl.
 CPC ............ *A63F 13/52* (2014.09); *A63F 13/335* (2014.09); *A63F 13/35* (2014.09); *H04N 21/4307* (2013.01); *A63F 2300/5533* (2013.01)

(58) Field of Classification Search
 None
 See application file for complete search history.

(56) References Cited

U.S. PATENT DOCUMENTS 10,307,673 B2 * 6/2019 Kuroda .................. A63F 13/35
10,912,998 B2 * 2/2021 Kuroda ................. A63F 13/358
(Continued)

FOREIGN PATENT DOCUMENTS

CN   102497447   6/2012
CN   106559426   4/2017
(Continued)

OTHER PUBLICATIONS

International Search Report dated Jan. 7, 2019 in PCT/CN2018/110566 filed Oct. 17, 2018.(With English Translation).
(Continued)

*Primary Examiner* — Dmitry Suhol
*Assistant Examiner* — Alex F. R. P. Rada, II
(74) *Attorney, Agent, or Firm* — Oblon, McClelland, Maier & Neustadt, L.L.P.

(57) ABSTRACT

Synchronous playback of content is provided. In a method for synchronous playback of a cutscene, first indication information is received by a first client. The first indication information is provided to the first client and a second client that participate in a game to synchronously playback the cutscene of the game. A first time point is determined by the first client based on the first indication information. The first time point indicates when the synchronous playback of the cutscene is to start on the first client. Further, the synchronous playback of the cutscene with the second client is starts in a case that the first time point is determined to be reached.

16 Claims, 7 Drawing Sheets

(51) Int. Cl.
    *A63F 13/35*     (2014.01)
    *H04N 21/43*     (2011.01)

(56) References Cited

U.S. PATENT DOCUMENTS

2012/0249806 A1   10/2012   Gong et al.
2017/0296920 A1*  10/2017   Kuroda ................ A63F 13/358

FOREIGN PATENT DOCUMENTS

CN      106730836    5/2017
WO    2007024289    3/2007

OTHER PUBLICATIONS

Written Opinion International Search Report dated Jan. 7, 2019 in PCT/CN2018/110566 filed Oct. 17, 2018.

* cited by examiner

| To-be-triggered task |||
|---|---|---|
| UI ID: 6 | Task ID: 104 | Trigger time: 0:11 |

METHOD AND APPARATUS FOR SYNCHRONOUSLY PLAYING ANIMATION, STORAGE MEDIUM, AND ELECTRONIC APPARATUS

RELATED APPLICATION

This application is a continuation of International Application No. PCT/CN2018/110566, filed on Oct. 17, 2018, which claims priority to Chinese Patent Application No. 201710967202.7, entitled "METHOD AND APPARATUS FOR SYNCHRONOUSLY PLAYING ANIMATION," and filed on Oct. 17, 2017. The entire disclosures of the prior applications are incorporated by reference in their entirety.

FIELD OF THE TECHNOLOGY

Embodiments of this application relate to the field of Internet.

BACKGROUND OF THE DISCLOSURE

A cutscene is the logic used for connecting game storylines in a game process, and is expressed in an animation form, to highlight key events and special plots.

When a current game state of a player meets a condition, such as reaching a condition of playing a cutscene after the player enters a region or completes a task, the cutscene is automatically played in a game client.

In the related technology, whether the condition of playing the cutscene is reached is determined by the client itself, and if the condition is reached, the action of playing the cutscene is immediately triggered in the local client.

For games of single players, the processing solution of the foregoing trigger condition is reasonable, but for multiplayer games, if each client still determines whether the condition of playing the cutscene is reached and triggers the action of playing the cutscene in the local client independently, the cutscene locally played by the plurality of players may be asynchronous, causing asynchronous timing of entering the game after the cutscene is played completely, which affects the game progress and game experience. Consequently, the asynchronous timing of displaying the cutscene causes inconsistent game progresses. The affected game progresses include, for example, when to trigger a strategy of NPC roles in the game, how to display information of team players for which the cutscene has not been played completely, and whether to enter the game after the cutscene has been played completely for all players.

For the technical problem of inconsistent game progresses caused by playing a cutscene, no effective solution has yet been proposed.

SUMMARY

Embodiments of this application provide a method and an apparatus for synchronously playing an animation, a non-transitory computer-readable storage medium, and an electronic apparatus, to resolve at least the technical problem of inconsistent game progresses caused by playing a cutscene.

According to an aspect of the embodiments of this application, a method for synchronous playback of a cut scene is provided. In the method, first indication information is received by processing circuitry of a first client. The first indication information is provided to the first client and a second client that participate in a game to synchronously playback the cutscene of the game. A first time point is determined by the processing circuitry based on the first indication information. The first time point indicates when the synchronous playback of the cutscene is to start on the first client. Further, the synchronous playback of the cutscene with the second client is started by the processing circuitry in a case that the first time point is determined to be reached.

According to an aspect of the embodiments of this application, the first indication information includes a timestamp and indicates a second time point, the timestamp indicates a clock time of a server when the server transmits the first indication information to the first client, and the second time point indicates when the synchronous playback of the cutscene is to start according to a clock of the server. Further, the determining includes determining the first time point based on the timestamp and the second time point.

According to an aspect of the embodiments of this application, the determining includes determining a time difference between a clock of the first client and the clock of the server according to the timestamp included in the first indication information, and determining the first time point based on a sum of the second time point indicated by the first indication information and the time difference.

According to an aspect of the embodiments of this application, the determining includes obtaining a network delay time for transmitting the first indication information from the server to the first client, the network delay time being a difference between the timestamp included in the first indication information and a clock time of the server when the first client receives the first indication information. The determining includes obtaining a timestamp difference between the server and the first client, the timestamp difference being a difference between the timestamp included in the first indication information and a timestamp of the clock of the first client when the first client receives the first indication information. The determining further includes setting a sum of the network delay time and the timestamp difference as the time difference between the clock of the first client and the clock of the server.

According to an aspect of the embodiments of this application, second indication information is received by the processing circuitry after the synchronous playback for the cutscene starts. The second indication information indicates a play progress of the cutscene. The cutscene is played back by the processing circuitry according to the play progress indicated by the second indication information in a case in which a play progress of the first client for the cutscene is different from the play progress indicated by the second indication information.

According to an aspect of the embodiments of this application, third indication information is received by the processing circuitry after the synchronous playback of the cutscene starts. The third indication information indicates synchronous display of target content by the first client and the second client, and the target content represents a process in which a Non Player Character (NPC) in the game changes. The target content is synchronously displayed by the processing circuitry in the first client with the second client in response to the third indication information.

According to an aspect of the embodiments of this application, a time difference between a clock of the first client and the clock of the server is obtained by the processing circuitry. A third time point indicated by the third indication information is obtained by the processing circuitry. The third time point indicates when the target content is to be displayed according to the clock of the server. A sum of the third time point and the time difference is determined by the processing circuitry as a fourth time point. The synchronously display of the target content is started with the second client in a case that the clock of the first client reaches the fourth time point.

According to an aspect of the embodiments of this application, the starting to synchronously display the target content includes displaying the target content in the cutscene in a case that the fourth time point is not later than a fifth time point. The fifth time point indicates when the first client is to end the synchronous playback of the cutscene. The target content is displayed by the processing circuitry in a game screen of the game in a case that the fourth time point is later than the fifth time point.

According to an aspect of the embodiments of this application, a method for synchronous playback of a cutscene is provided. In the method, first indication information is determined by processing circuitry of a server. The first indication information indicates a first time point for the synchronous playback of the cutscene of a game. The first indication information is transmitted by the processing circuitry to a first client and a second client that participate in the game. The synchronous playback of the cutscene is started at the first client and the second client based on the first time point indicated by the first indication information.

According to an aspect of the embodiments of this application, second indication information is transmitted by the processing circuitry to the first client and the second client. The second indication information indicates a play progress of the cutscene. The cutscene is played back in at least one of the first client or the second client according to the play progress indicated by the second indication information in a case that a play progress of the at least one of the first client or the second client for the cutscene is different from the play progress indicated by the second indication information.

According to an aspect of the embodiments of this application, third indication information is transmitted by the processing circuitry to the first client and the second client. The third indication information indicates synchronous display of target content in the first client and the second client, and the target content represents a process in which a Non Player Character (NPC) in the game changes.

According to an aspect of the embodiments of this application, a first client apparatus is provided. The first client apparatus includes processing circuitry configured to perform any of the synchronous playback methods of the first client, for example as described above.

According to an aspect of the embodiments of this application, a server apparatus is provided. The server apparatus includes processing circuitry configured to perform any of the synchronous playback methods of the server, for example as described above.

According to aspects of the embodiments of this application, non-transitory computer-readable storage mediums are further provided. The storage mediums store instructions which when executed one or more processors cause the one or more processors to perform any of the synchronous playback methods.

According to an aspect of the embodiments of this application, an electronic apparatus is further provided, including a memory, a processor, and a computer program that is stored in the memory and that may be run in the processor, and the processor performs the foregoing methods by using the computer program.

In the embodiments of this application, first indication information is obtained on a first client, the first indication information being used for indicating the first client and a second client that participate in a game to synchronously play a cutscene of the game; a first moment is determined based on the first indication information, the first moment being a moment at which the cutscene starts to be played on the first client; and the cutscene starts to be synchronously played with the second client in a case in which the time on the first client reaches the first moment. The cutscene of the first client and the second client in the game is synchronously played, so that game progresses can maintain consistency, and the technical problem of inconsistent game progresses caused by playing a cutscene can be resolved, to achieve the technical effect of maintaining consistent game progresses.

BRIEF DESCRIPTION OF THE DRAWINGS

Accompanying drawings described herein are used to provide further understanding of the embodiments of this application, and constitute a part of this application; and schematic embodiments of this application and their description are used to explain this application, and are not intended to limit the scope of this application.

DESCRIPTION OF EMBODIMENTS

To enable a person skilled in the art to better understand the solutions in the embodiments of this application, the technical solutions in the embodiments of this application will be described below with reference to the accompanying drawings of the embodiments of this application. The described embodiments are merely some but not all of the embodiments of this application. All other embodiments obtained by a person skilled in the art based on the embodiments of this application fall within the protection scope of this application.

In the specification, claims, and accompanying drawings of this application, the terms "first," "second," and the like are intended to distinguish between similar objects rather than indicating a specific order. It is to be understood that data used in this way can be interchanged in an appropriate case, so that the embodiments of this application that are described herein can be implemented in a sequence other than those sequences illustrated or described herein. In addition, the terms "include," "comprise," and any variants thereof are intended to cover a non-exclusive inclusion. For example, a process, method, system, product, or device that includes a series of steps or units is not limited to the steps or units that are clearly listed, but may include other steps or units that are not clearly listed or that are inherent to the process, method, product, or device.

First, some acronyms and terms appearing in the present application are described below:

FPS is short for First-Person Shooting, and an FPS game may be a first-person shooting game run in a mobile phone.

NPC is short for Non Player Character, such as a terrain collision object in a game.

PVE is short for Player VS Environment. Players battle against AI according to designed storylines, for example, a plurality of players cooperate with each other in the same scenario to complete levels (e.g., missions/tasks) according to storylines.

Task system is key task points that need to be completed according to fixed storylines, and is triggered by a server and synchronized to each client to perform corresponding actions.

Unity3D is a multi-platform composite game development tool allowing players to easily create interactive content of different types such as a three-dimensional video game, architectural visualization, a real-time three-dimensional animation. Unity3D is a fully integrated professional game engine.

PhysX is pronounced like Physics, is a physics engine, and is one of the three largest physics engines in the world, where the other two are Havok and Bullet. Another meaning of a demonstration program of a PhysX engine is a physical accelerator card specialized in calculating the PhysX engine.

An embodiment of a method for synchronously playing an animation is provided.

Figure 1:
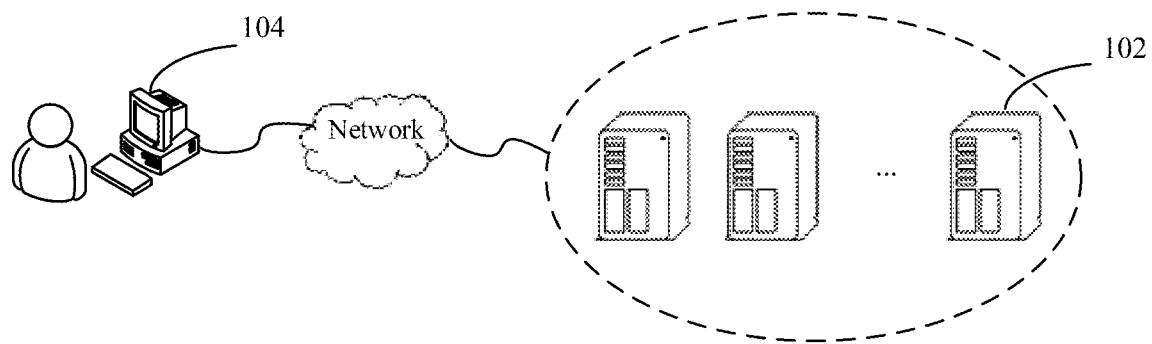
FIG. 1 is a schematic diagram of a hardware environment of a method for synchronously playing an animation according to an embodiment of this application.

In this embodiment, the method for synchronously playing an animation may be applied to a hardware environment including a server 102 and a terminal 104 shown in FIG. 1. As shown in FIG. 1, the server 102 is connected to the terminal 104 through a network. The network includes but is not limited to: a wide area network, a metropolitan area network, or a local area network, and the terminal 104 is not limited to a PC, a mobile phone, a tablet computer, or the like. The method for synchronously playing an animation in this embodiment of this application may be performed by the server 102, or may be performed by the terminal 104, or may be performed jointly by the server 102 and the terminal 104. Specifically, a client installed in the terminal 104 may perform the method for synchronously playing an animation in this embodiment of this application.

When the method for synchronously playing an animation in this embodiment of this application is performed jointly by the server and the terminal, the server transmits indication information to a client of the terminal. In this case, the client executes program code corresponding to the method in this embodiment of this application.

When the method for synchronously playing an animation in the embodiments of this application is performed by the server or the terminal alone, the program code corresponding to the method in this embodiment of this application may be directly executed on the server or the terminal.

For example, when the method in this embodiment of this application is performed on the server, the following functions may be performed:

(1) Indicate a Start Moment and/or an End Moment of Synchronous Playing

The server obtains first indication information. The first indication information can be used for indicating a first client and a second client that participate in a game to synchronously play a cutscene in the game, and the first indication information carries a play start moment (namely, a second moment/time) and/or a play end moment of the cutscene determined according to a clock system of the server.

The server transmits the first indication information to the first client and the second client. The first indication information may indicate to the first client to start playing the cutscene with the second client synchronously when the time on the first client reaches a first moment/time. The first moment may be a moment at which the cutscene starts to be synchronously played on the first client with the second client and may be determined by the first client based on the first indication information.

If the clock systems used in the first client and the second client are the same as the clock system of the server (e.g., the standard time is consistent), the cutscene may be directly played according to the play start moment and the play end moment indicated by the first indication information; and if the clock systems used in the first client and the second client are different from the clock system of the server, the first client and the second client may need to convert the indicated play start moment and play end moment into the time on their own clock systems.

(2) Indicate a Progress of the Synchronous Playing at a Specified Time

The server transmits second indication information to the first client and the second client at a specified time. The second indication information indicates a play progress of the cutscene. The cutscene may be played in the first client and/or the second client according to the play progress indicated by the second indication information when a play progress of the first client and/or the second client for the cutscene is different from the play progress indicated by the second indication information.

The second indication information may indicate that a progress played at a specified moment is a specified progress. The specified moment may be determined according to the clock system of the server, and the first client and the second client may determine, when the specified moment arrives, whether the play progress on their own clients matches specified progress, and if the play progress on their own clients matches the specified progress, the first client and the second client may start to play from the specified progress when the specified moment arrives.

Advantages of indicating the progress of the synchronous playing at a specified time include: 1) If a client does not calculate a time difference accurately according to the first indication information, the cutscene played in the clients may be asynchronous, and by using the specified progress, the cutscene played in the clients may be adjusted to be synchronous; and 2) After the client reconnects after being disconnected from the server or the Internet, the cutscene may start to play from the specified progress to maintain synchronization with other clients/users.

(3) Indicate Specific Content

The server transmits third indication information to the first client and the second client. The third indication information may indicate target content synchronously displayed in the first client and the second client, and the target content is used for representing a process in which an NPC in the game changes.

The third indication information indicates that playing the target content at a specified moment synchronously in the first and second client. The specified moment may be determined according to the clock system of the server. The target content may be a process in which an NPC changes. The process includes, but is not limited to, an environment change process, an AI role change process, and a scenario change process.

The following describes the method in the embodiments of this application in detail by using an example in which program code corresponding to the method in the embodiments of this application is executed on the server or the terminal.

Figure 2:
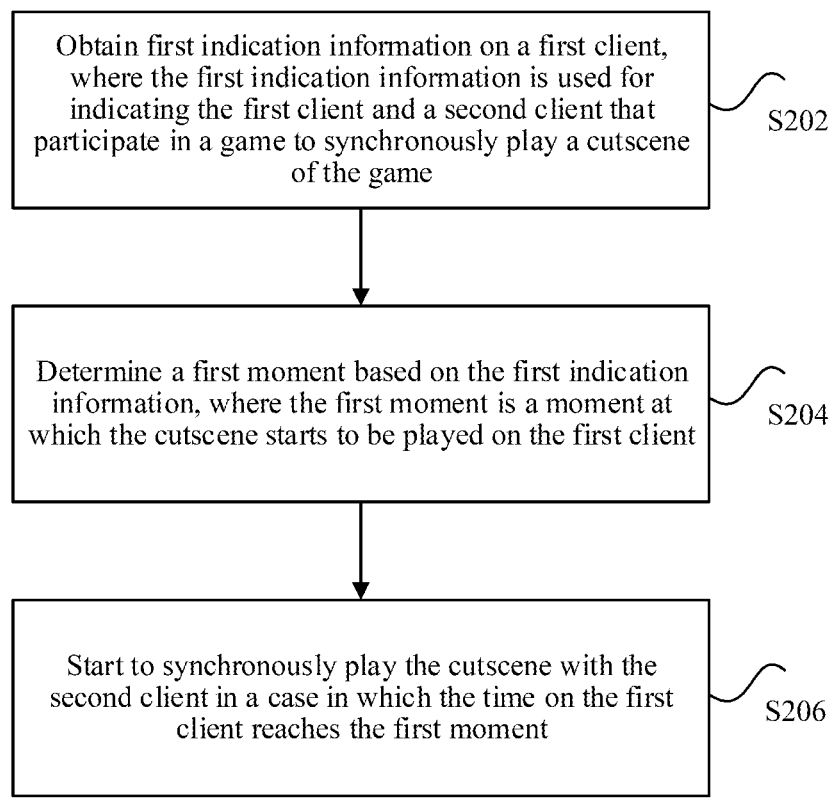
FIG. 2 is a flowchart of a method for synchronously playing an animation according to an embodiment of this application.

When the method in this embodiment of this application is performed on the terminal, corresponding synchronization functions may be performed according to indications of the server. FIG. 2 is a flowchart of an exemplary method for synchronously playing an animation according to an embodiment of this application. As shown in FIG. 2, the method may include the following steps.

At step S202, first indication information is obtained on a first client. The first indication information indicates when the first client and a second client that participate in a game need to synchronously play a cutscene of the game.

The method in the embodiments of this application is run on both the first client and the second client. The method in the embodiments of this application is described by using a terminal in which the first client is located as an execution body of the method. The clients (including the first client and the second client) are game clients of a game. The clients may be installed on the terminal. The terminal includes, but is not limited to, a PC, a mobile phone, and a tablet computer. The second client refers to another client in a game. There may be one or more second clients.

The transmission form of the first indication information includes, but is not limited to: performing transmission according to an agreed protocol, and/or an agreed command or instruction. The first indication information herein refers to information that indicates a start moment of the cutscene and that is transmitted to the first client and the second client by the server. The first indication information may further include an end moment of the cutscene. The server may transmit the first indication information to the first client and the second client simultaneously, or may transmit the first indication information to the first client and the second client at different moments.

At step S204, a first moment/time is determined based on the first indication information. The first moment may be a moment at which the cutscene starts to be played on the first client.

When the first client determines the first moment based on the first indication information, if a clock system used in the first client is the same as the clock system of the server (the standard time is consistent), the cutscene may be directly played according to the first moment indicated by the first indication information; and if the clock system used in the first client is different from the clock system of the server, the first client may convert an indicated play start moment into the time (e.g., the first moment) based on its own clock system.

Correspondingly, when the foregoing steps are performed on the second client, the second client may also receive the first indication information, and use the foregoing similar method to determine the start moment for playing the cutscene according to a clock system of the second client.

At step S206, synchronous playback of the cutscene with the second client starts when the time on the first client reaches the first moment.

On the first client, the first client starts to play the cutscene from the first moment, and on the second client, the second client starts to play the cutscene from a moment, which may be different from the first moment. But both of the moments are determined according to the play start moment indicated by the first indication information. Therefore, it can be ensured that both the first client and the second client start to play the cutscene according to the play start moment indicated by the server.

For a multiplayer game, each client performs the action of playing a cutscene in the local client according to a play start moment specified by a server, so that the cutscene locally played by the plurality of players are synchronous, and the timing of entering the game after the cutscene is played completely is synchronous, thereby unifying game progress, and improving game experience.

By using the foregoing steps S202, S204, and S206, the first indication information is obtained on a first client. The first indication information indicates when the first client and a second client that participate in a game are to synchronously play a cutscene of the game. A first moment may be determined based on the first indication information, and the first moment may be a moment at which the cutscene starts to be played on the first client. The cutscene starts to be synchronously played with the second client when the time on the first client reaches the first moment. The cutscene of the first client and the second client in the game is synchronously played, so that game progresses can maintain consistency, and the technical problem of inconsistent game progresses caused by playing a cutscene can be resolved.

According to an embodiment of this application, the server triggers a cutscene task to a client by using a task system. The client performs the cutscene task, and after a stipulated time, the server instructs the client again to convert a state of a scenario NPC object to change scenario collision information. Meanwhile, according to information configured for an NPC, the server changes physical collision information of a scenario loaded by the server, so that scenario physical information of the server maintains consistency with that of the client. The preset NPCs in the task system and the scenario are configured by the client and guided to the server, and the server reads the configuration, triggers corresponding tasks one by one according to task conditions, and synchronizes the tasks to the client for performance. The following describes this embodiment of this application in detail from three aspects with reference to the steps shown in FIG. 2:

(1) Determine a Start Moment and/or an End Moment of Synchronous Playing

In the technical solution provided in step S202, first indication information is obtained on a first client, where the first indication information is used for indicating to the first client and a second client that participate in a game to synchronously play a cutscene of the game.

The obtaining of first indication information on a first client includes content of two aspects: One is obtaining first indication information transmitted by the server on the first client; and the other is that a terminal processor obtains a timestamp carried in the first indication information and a second moment indicated by the first indication information from the first indication information obtained on the first client.

The timestamp is a moment at which a clock system of the server transmits the first indication information to the first client, the second moment is a moment at which the cutscene starts to be played according to the clock system of the server, the timestamp and the second moment are used for obtaining a play moment of the cutscene in the first client, and the timestamp and the second moment are further used for obtaining a play moment of the cutscene in the second client, so that the cutscene is synchronously played on the first client and the second client.

In the technical solution provided in step S204, a first moment is determined based on the first indication information, where the first moment is a moment at which the cutscene starts to be played on the first client according to a clock system of the first client.

Optionally, the first moment determined based on the first indication information may be implemented in the following manners.

A time difference DeltaTime between a clock system of the first client and the clock system of the server is determined according to the timestamp carried in the first indication information, where the timestamp is a moment indicated by the clock system of the server when the server transmits the first indication information to the first client.

The time difference includes two components, one is a network delay time, and the other is a timestamp difference.

(1) Determine a Network Delay Time PingDeltaTime

A network delay time PingDeltaTime for transmitting the first indication information in the server and the first client is obtained, where the network delay time is a difference between a timestamp T0 carried in the first indication information and a moment T2 at which the clock system of the server is when the first client receives the first indication information.

(2) Determine a Timestamp Difference LogicalDeltaTime

A timestamp difference LogicalDeltaTime between the server and the first client is obtained, where the timestamp difference is a difference between the timestamp T0 carried in the first indication information and the moment T1 at which the clock system of the first client is when the first client receives the first indication information.

A sum of the network delay time PingDeltaTime and the timestamp difference LogicalDeltaTime is set as the time difference DeltaTime between the clock system of the first client and the clock system of the server.

(3) Calculate a Play Start Moment Logical StartTime and/or a Play End Moment LogicalEndTime of the Client A sum of a second moment ServerStartTime indicated by the first indication information and the time difference DeltaTime as the first moment is used, where the second moment is a moment at which the cutscene starts to be played according to the clock system of the server.

For the play start moment (namely, the first moment) of the client:

Logical StartTime=ServerStartTime+DeltaTime; and for the play end moment (namely, the fifth moment) of the client:

LogicalEndTime=ServerEndTime+DeltaTime.

In the technical solution provided in step S206, the cutscene starts to be synchronously played with the second client when the time on the first client reaches the first moment.

The server may transmit the first indication information in advance (before the time reaches the second moment), so that the first client and the second client can complete time conversion. After the first client and the second client complete the time conversion, the first client and the second client perform synchronous playing when their respective times reach the play start moment determined according to their respective time systems.

(2) Determine a Progress of the Synchronous Playing

After the cutscene starts to be synchronously played with the second client when the time on the first client reaches the first moment, the server may regularly transmit second indication information to the first client and the second client, to indicate a play progress in which the cutscene needs to be at a moment.

The server can regularly transmit the second indication information to the first client and the second client.

Optionally, the cutscene may be split into a plurality of progresses according to play duration. If the duration of the cutscene is 60 seconds, the 60 seconds may be split into one progress by every 10 seconds, that is, the play duration is 10 seconds, 20 seconds, 30 seconds, 40 seconds, 50 seconds, and 60 seconds, which respectively represent one progress.

Each progress may be indicated in advance by using the second indication information. If the server indicates to start to play the cutscene according to the time 18:15 of the server, the server may provide an indication to the client by using the second indication information before 18:15:10 arrives, and the progress to which the cutscene needs to be played at 18:15:10 is the progress of 10 seconds.

The second indication information is obtained on the first client, where the second indication information is used for indicating a play progress of the cutscene. As indicated by the second indication information, the progress to which the cutscene needs to be played at 18:15:10 is the progress of 10 seconds.

The cutscene is played in the first client according to the play progress indicated by the second indication information in a case in which a play progress of the first client for the cutscene is different from the play progress indicated by the second indication information.

When the client receives the second indication information at 18:15:05, a play progress of the client is the progress of 3 seconds, so that when the time reaches 18:15:10, the play progress is the progress of 8 seconds, which is obviously asynchronous with other clients. In this case, the client may select to perform adjustment, and the adjustment manner includes, but is not limited to, the following two types:

One is performing adjustment in advance: To meet the progress that when the time reaches 18:15:10, the progress is 10 seconds, the progress may be adjusted before the time reaches 18:15:10. For example, after the second indication information is received at 18:15:05, at 18:15:06, the play progress is directly adjusted from 3 seconds to the progress of 6 seconds.

The other is performing adjustment according to indications: To meet the progress that when the time reaches 18:15:10, the progress is 10 seconds, the progress may be adjusted when the time reaches 18:15:10, and when the time reaches 18:15:10, the playing starts directly from the progress of 10 seconds.

In the foregoing embodiments, the clock system of the server is used as the standard for description. If the clock system of the client is different from that of the server, in the foregoing embodiments, the client further needs to perform conversion according to the foregoing clock conversion manner, to convert the time indicated by the server into the local time of the client.

(3) Play NPC Content

Figure 3:
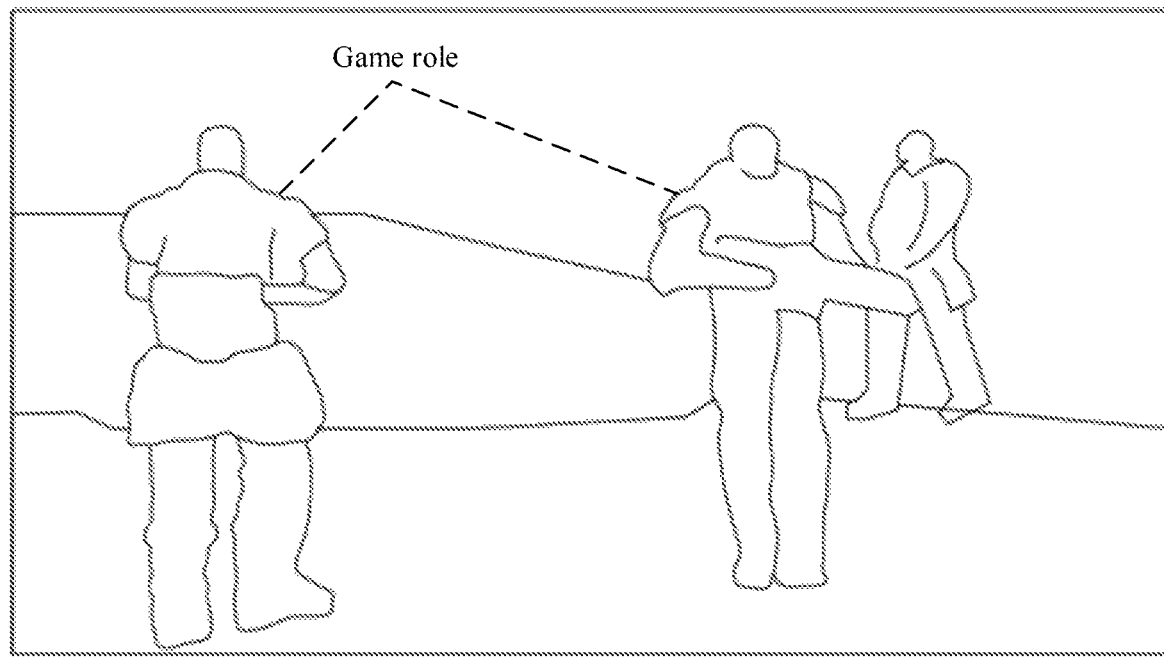
FIG. 3 is a schematic diagram of a cutscene according to an embodiment of this application.

In the related technology, as shown in FIG. 3, when the current scenario terrain needs to be changed during or after the playing of the cutscene, it is also processed by the client itself. The client automatically displays or hides preset terrain objects that need to be hidden or displayed, to bridge the change of the current scenario terrain caused due to the impact of factors such as the destruction of the BOSS (namely, the NPC role with strong power in the game) or the tricks in cutscene storylines, to improve game immersion and game experience of players. For example, in a level type game such as "War Machine", a cutscene bridging plot is usually controlled and played by the client itself, and after the cutscene ends, the current scenario terrain is also changed by the client. Similarly, this also affects the consistency of the game progress to some extent. If one of the clients has not completed the terrain change, and the other clients have completed the terrain change, the clients that have completed the terrain change need to wait for the client that has not completed the terrain change.

In this embodiment of this application, a solution is provided. After the cutscene starts to be synchronously played with the second client when the time on the first client reaches the first moment, the server may transmit third indication information to the first client and the second client, to indicate synchronous display target content in the first client and the second client, where the target content is used for representing a process for an NPC change in a game.

The third indication information transmitted by the server is obtained on the first client.

Optionally, the target content indicated by the third indication information includes, but is not limited to, an environment change process, an AI role change process, and a scenario change process (such as the foregoing terrain collision event).

The target content is synchronously displayed in the first client with the second client in response to the third indication information.

The third indication information indicates that the moment at which the client starts to play the target content (the time determined according to the clock system of the server) may further include a moment at which playback of the target content.

If the clock system of the client is different from that of the server, the client may perform conversion according to the foregoing clock conversion method. Details are as follows: A time difference between a clock system of the first client and the clock system of the server is obtained, and a third moment indicated by the third indication information is obtained, where the third moment is a moment at which the target content is displayed according to the clock system of the server; and a sum of the third moment and the time difference is obtained as a fourth moment (namely, a moment at which the first client starts to display the target content in the local clock system). The target content starts to be synchronously displayed with the second client in a case in which the clock system of the first client reaches the fourth moment.

Likewise, if the third indication information further indicates a display end moment, the third indication information may also be obtained through calculation according to the foregoing manner.

Optionally, the starting to synchronously display the target content with the second client in a case in which the clock system of the first client reaches the fourth moment includes the following two implementations:

(1) The server may indicate an event that the NPC changes in the cutscene, and display the target content in the cutscene in a case in which the fourth moment is not later than a fifth moment, where the fifth moment is a moment at which the first client ends playing the cutscene.

(2) The server may indicate an event that the NPC changes after the cutscene is played completely, and display the target content in a game screen of a game in a case in which the fourth moment is later than the fifth moment.

In the related technology, because the change of the scenario is processed by the client itself, and the server has no related collision information, it cannot be ensured that the scenario of each player changes at the same moment, causing asynchronous performances, for example, other players passing through obstacle models is seen on the current client, or a hanging performance of the players, which affects game experience. In this embodiment of this application, the time of the server is logically aligned with the time of the client, to ensure that each client can change the terrain and the like simultaneously after the cutscene of the same time under the logical driven of the server. Meanwhile, the server may also correspondingly change the scenario physical information, to maintain consistency with the clients, to ensure that the clients cannot pass through or do not miss steps before the terrain is changed.

In an optional embodiment, the following provides details from the technology side.

(1) A Dedicated Server (DS) Network Synchronization Solution

Figure 4:
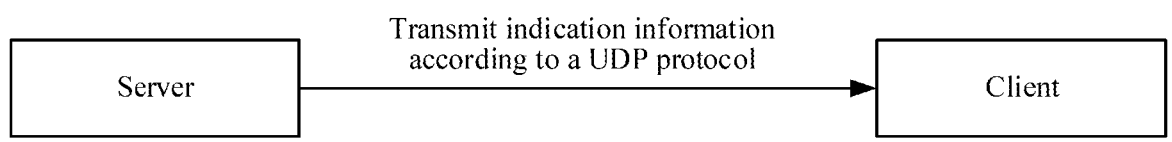
FIG. 4 is a schematic diagram of information transmission according to an embodiment of this application.

As shown in FIG. 4, the server transmits a reliable packet (a packet loss retransmission mechanism) according to a UDP protocol. The UDP reliable packet is used for transmitting indication information in this embodiment of this application.

By using the cutscene terrain synchronization solution in this embodiment of this application, the server controls the process of triggering the cutscene to play, the server controls scenario terrain NPCs to change, and the clients receive server information to only make performance. The technical solutions may be implemented based on a DS network synchronization framework, and in the framework:

(1) The server has a complete game logic, and the main logic of the entire game process is driven by the server.

(2) The clients make performance, where the players and the scenario collision are processed by the clients, the server performs correction, and when position information delivered by the server is greatly different from that of the clients, the clients are forced to be pulled back to the position of the server, to ensure synchronization.

(3) The server also processes collision information between the scenario and the players, and delivers a processing result (through the third indication information) to the clients for performance.

The technical solutions in the embodiments of this application may be applied to a mobile game developed based on a Unity engine. In the DS synchronization solution, the server runs a set of a PhysX component and a Recast Navigation component (a component in the Unity engine) with the same version as the Unity engine, to ensure that the processing results of both parties for the same data are consistent. The server parses static scenario physical information guided by the clients, to construct a scenario physical world of the server, and dynamic NPC information guided by the clients is used for dynamically changing the scenario physical information.

(2) Logical Time Alignment

A plurality of PVE game players and the server may respectively maintain a time system, which is mutually inconsistent. In the technical solutions in this embodiment of this application, the server regularly delivers the current time of the server to the clients, so that the clients calculate a timestamp difference between their respective time system and the time system of the server. According to specific algorithms, the time of the server is converted into the local time for processing, so that time trigger points of the clients and the server maintain synchronous.

Figure 5:
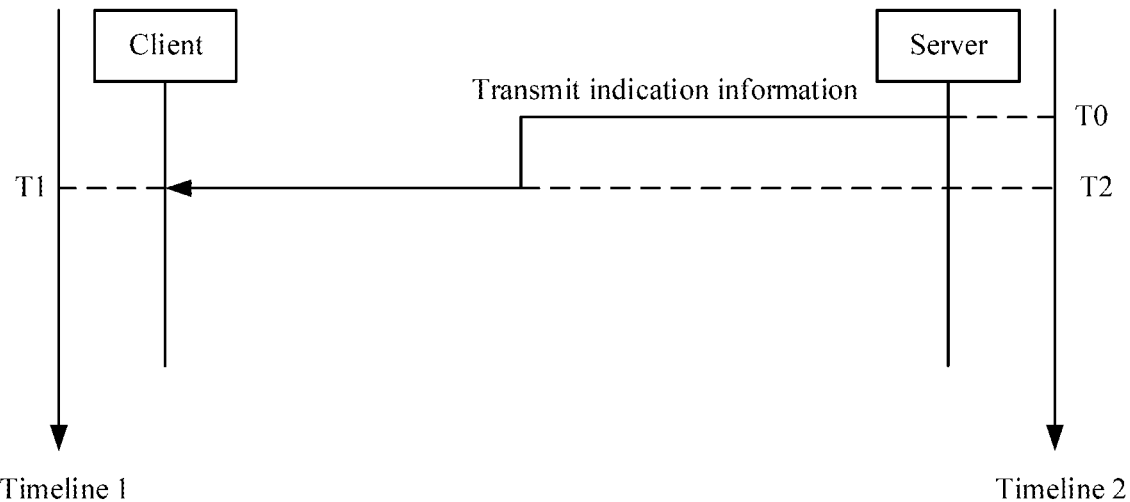
FIG. 5 is a schematic diagram of information transmission according to an embodiment of this application.

As shown in FIG. 5, a timeline 1 represents a clock system of a client, a timeline 2 represents a clock system of a server, the server delivers a time synchronization packet (such as indication information) to clients at a moment T0, and the clients receive the packet at a moment T1. In this case, the server has reached the moment T2.

Therefore, the network delay transmission time difference PingDeltaTime=T2−T0. In a T0 packet, the server carries the current timestamp of the server, and therefore, the timestamp difference between the client and the server may be calculated, that is, LogicalDeltaTime=T1−T0. Therefore, the real timestamp difference between the client and the server may be obtained through calculation, that is, DeltaTime=LogicalDeltaTime+PingDeltaTime.

When the cutscene is synchronized, the server delivers the server time at which the cutscene is predicted to end to the clients, and the clients further calculate, according to the calculated timestamp difference with the server, the time at which the clients end playing the cutscene (convert the server time into the client time).

LogicalEndTime=ServerEndTime+DeltaTime.

(3) NPC State Synchronization Solution

Figure 6:
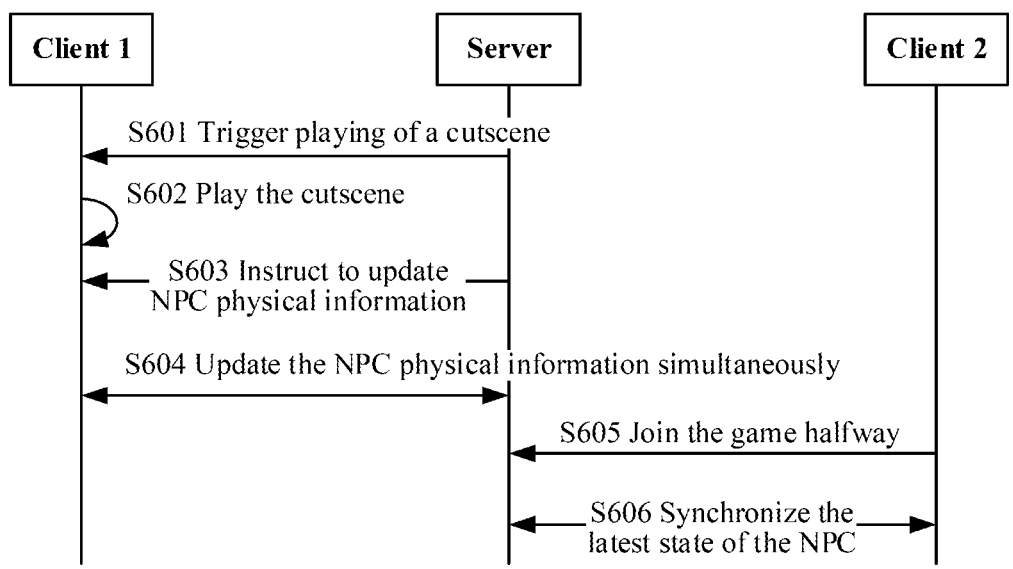
FIG. 6 is a flowchart of a method for synchronously playing an animation according to an embodiment of this application.

Each NPC has an object in a client and an object in a server that are in a one-to-one correspondence, and has the same physical collision information, identified by an exclusive ID. When the cutscene is triggered, a client 1 may estimate a cutscene end time (namely, LogicalEndTime) through logical time synchronization, and stop playing the cutscene when the time arrives. In this case, the server broadcasts physical information updated by the NPC to the clients, and the client 1 performs a corresponding change according to the instruction of the server to achieve the effect of dynamically updating the scenario. For a customizable state attribute in the NPC, when the players join the game halfway or reconnect to the game after connection drops, the server synchronizes the latest state to a client 2, to ensure the consistency between the client 2 and the server. A specific implementation process is shown in FIG. 6:

In step S601, the server transmits first indication information to a client 1 (the first client), to trigger playing of a cutscene.

In step S602, the client 1 calculates a start time and an end time, and plays the cutscene.

In step S603, the server transmits third indication information to the first client, to instruct update of the NPC physical information.

Figure 7:
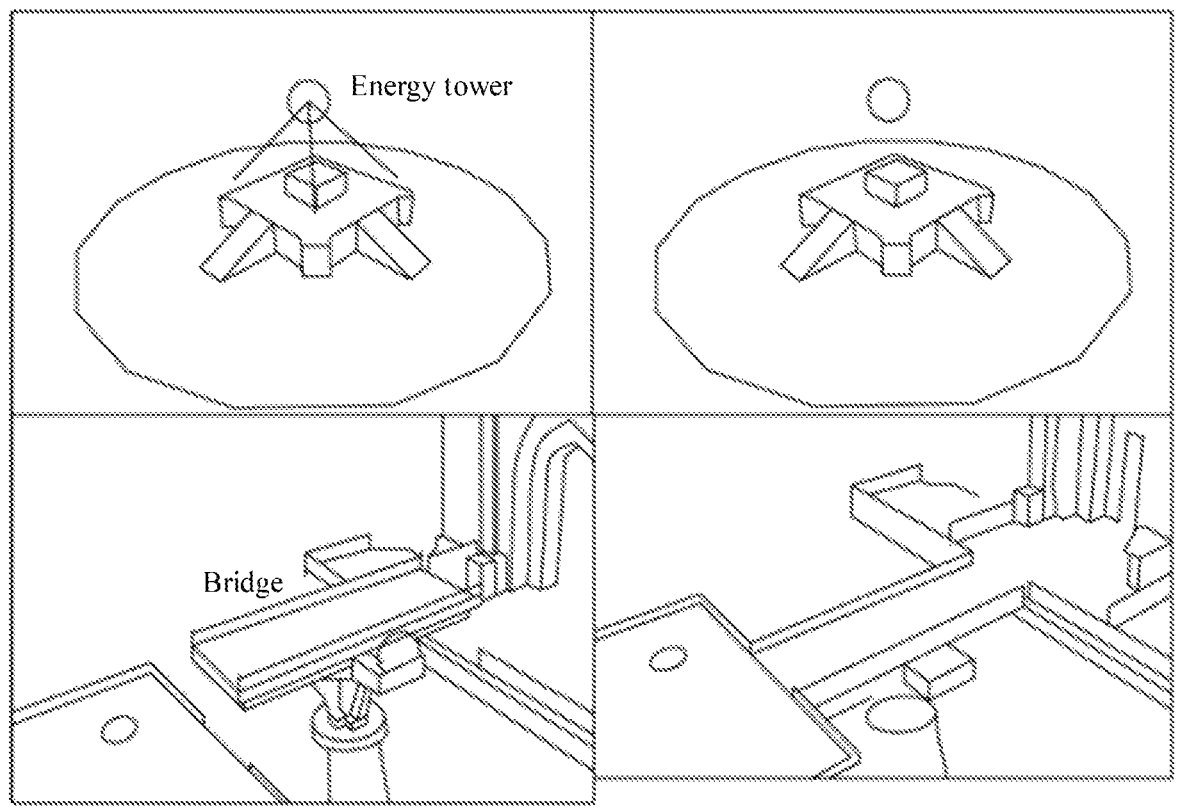
FIG. 7 is a schematic diagram of a cutscene according to an embodiment of this application.

In step S604, the client 1 and the server update the NPC physical information simultaneously. As shown in FIG. 7, changes about an energy tower and a bridge are synchronous, and from the energy tower emitting energy to stop emitting energy, the bridge changes from being not in a connected state to be in a connected state.

In step S605, a client 2 (second client) joins the game halfway (such as joining after a connection drop).

In step S606, the clients and the server synchronize the latest state of the NPC.

(4) About a Product Form of a Game (a Game Product) Implemented by the Method in this Embodiment of this Application For multi-player PVE, as a typical playing method of a game (such as a shooting game or a role playing game), a cutscene terrain conversion system is added in a game storyline pushed by a cutscene, and the content of the game is enriched. To achieve the objectives of simultaneously playing the cutscene on different clients, and simultaneously changing scenario terrain collision information, the method provided in this embodiment of this application may be used to uniformly implement the terrain conversion function in the cutscene playing process, and the cutscene playing function.

A game artist makes the cutscene according to a cutscene editing tool, each game scenario object may be configured in the same timestamp by the tool to change corresponding attributes, such as playing an animation, playing particle effects, playing music, and changing an object position and size. Each timeline in the tool may process one scenario object.

Figure 8:
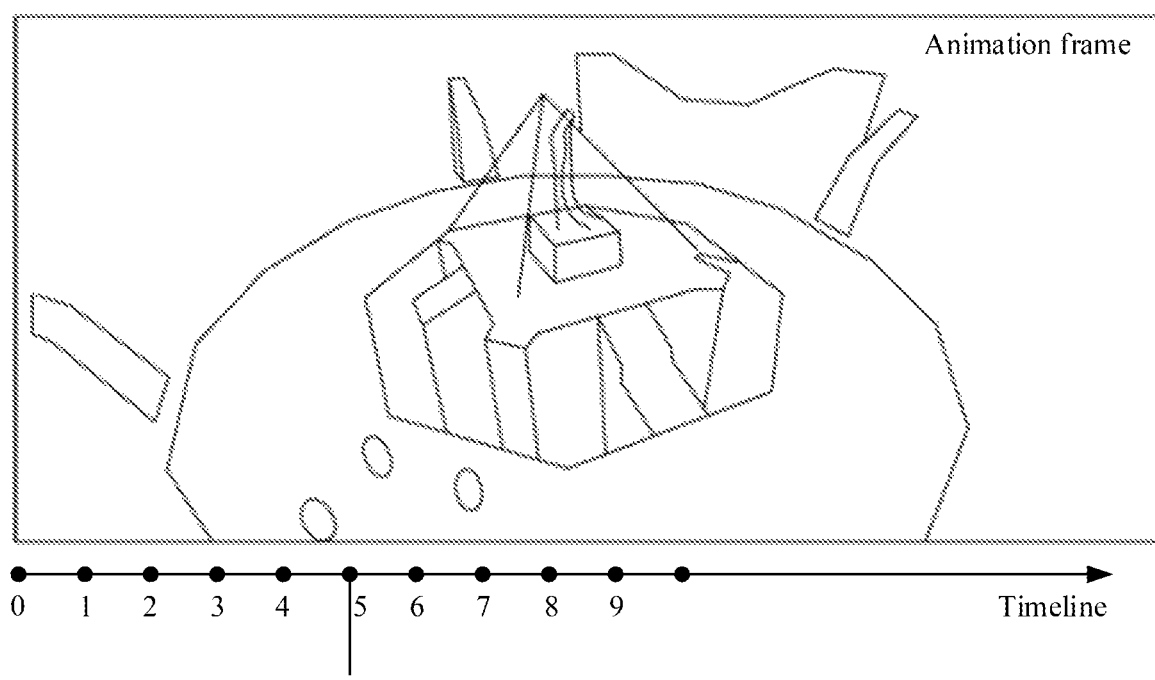
FIG. 8 is a schematic diagram of a cutscene according to an embodiment of this application.

FIG. 8 shows an animation frame that needs to be displayed on a timeline at a moment (such as the $5^{th}$ second).

Figures 9, 10:
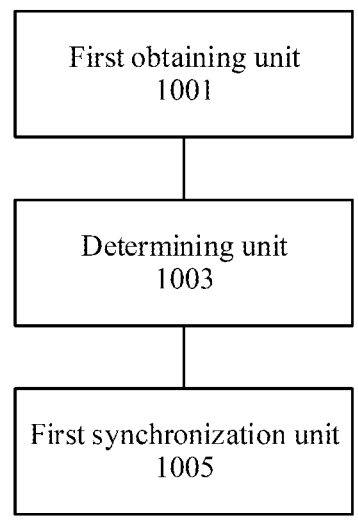
FIG. 9 is a schematic diagram of a cutscene according to an embodiment of this application.
FIG. 10 is a schematic diagram of an apparatus for synchronously playing an animation according to an embodiment of this application.

A game designer configures corresponding cutscene trigger task points according to storyline needs by using a task system configuration tool, arranges NPC objects that need to be displayed or hidden in scenarios, and associates the NPC objects to a task system. The server drives a task progress of the game according to the configuration information and synchronizes the task progress to the clients for performance. As shown in FIG. 9, the ID of a to-be-triggered task is 104, and the task needs to be triggered at a particular moment (such as at 11 seconds) of a UI task (ID is 6).

By using the foregoing embodiment of this application, the synchronization of the cutscene, and the NPC logical control function are implemented, and all players in the same scenario can change the terrain in time synchronously during the cutscene, thereby greatly enriching the content of the game. When a plurality of players are in the same PVE storyline level, after a key task is triggered, the server instructs all clients to play a cutscene with a storyline, and change the current scenario terrain simultaneously after a period of time, thereby enhancing the immersion and game experience of the players.

The foregoing method embodiments are expressed as a series of action combinations for the purpose of brief description. However, some steps may be performed in other sequences or simultaneously according to embodiments of this application. The embodiments of this application are not limited to a described action sequence. In addition, embodiments described in this specification are all exemplary embodiments; and therefore, an action and a module involved are not necessarily mandatory in the embodiments of this application.

Based on the foregoing descriptions of the embodiments, a person skilled in the art may understand that the method in the foregoing embodiments may be implemented by software in addition to a necessary universal hardware platform or by hardware only. However, the former is a better implementation in some embodiments. Based on such an understanding, the embodiments may be implemented in a form of a software product. The computer software product is stored in a storage medium (e.g., a non-transitory computer-readable storage medium such as a ROM/RAM, a magnetic disk, or an optical disc) and includes several instructions for instructing a terminal device (which may be a mobile phone, a computer, a server, a network device, or the like) to perform the methods described in the embodiments of this application.

The apparatus for synchronously playing an animation in the embodiments of this application may be further applied to a terminal. FIG. 10 is a schematic diagram of an optional apparatus for synchronously playing an animation according to an embodiment of this application. As shown in FIG. 10, the apparatus may include one or more processors (or processing circuitry) and one or more memories storing program units. The program units are executed by the processor, and the program units include: a first obtaining unit 1001, a determining unit 1003, and a first synchronization unit 1005.

The first obtaining unit 1001 is configured to obtain first indication information on a first client, the first indication information being used for indicating to the first client and a second client that participate in a game to synchronously play a cutscene of the game;

The method in the embodiments of this application is run on both the first client and the second client. The method in the embodiments of this application is described by using a terminal in which the first client is located as an execution body of the method. The clients (including the first client and the second client) are game clients of a game. The clients may be installed on the terminal. The terminal includes, but is not limited to, a PC, a mobile phone, and a tablet computer. The second client refers to other clients than the first client in a game. There may be one or more second clients.

The transmission form of the first indication information includes, but is not limited to: performing transmission according to an agreed protocol, and performing transmission according to an agreed command or instruction. The first indication information herein refers to information that is used for indicating a start moment (an end moment may be further included) of the cutscene and that is transmitted to the first client and the second client by the server. The server may transmit the first indication information to the first client and the second client simultaneously, or may transmit the first indication information to the first client and the second client at different moments.

The determining unit 1003 is configured to determine a first moment based on the first indication information, the first moment being a moment at which the cutscene starts to be played on the first client.

When the first client determines the first moment based on the first indication information, if a clock system used in the first client is the same as the clock system of the server (the standard time is consistent), the cutscene may be directly played according to the first moment indicated by the first indication information; and if the clock system used in the first client is different from the clock system of the server, the first client may convert an indicated play start moment into the time (the first moment) on its own clock system.

Correspondingly, when the foregoing steps are performed on the second client, the second client may also receive the first indication information, and use the foregoing similar method to determine the start moment for playing the cutscene according to a clock system of the second client.

The first synchronization unit 1005 is configured to start to synchronously play the cutscene with the second client in a case in which the time on the first client reaches the first moment.

On the first client, the first client starts to play the cutscene from the first moment, and on the second client, the second client starts to play the cutscene from a moment. The moment and the first moment may be different, but are both determined according to the play start moment indicated by the first indication information. Therefore, it can be ensured that both the first client and the second client start to play the cutscene according to the play start moment indicated by the server.

For multiplayer games, each client performs the action of playing a cutscene in the local client according to a play start moment specified by a server, so that the cutscene locally played by the plurality of players are synchronous, and the timing of entering the game after the cutscene is played completely is synchronous, thereby unifying game progress, and improving game experience.

The first obtaining unit 1001 in this embodiment may be configured to perform step S202 in the embodiments of this application, the determining unit 1003 in this embodiment may be configured to perform step S204 in the embodiments of this application, and the first synchronization unit 1005 in this embodiment may be configured to perform step S206 in the embodiments of this application.

Examples and application scenarios implemented by the foregoing modules and corresponding steps are the same but are not limited to the content disclosed in the foregoing embodiments. The foregoing modules may run in the hardware environment shown in FIG. 1 as a part of the apparatus, may be implemented by using software, or may be implemented by using hardware. The hardware environment includes a network environment.

By using the foregoing modules, first indication information is obtained on a first client, the first indication information being used for indicating the first client and a second client that participate in a game to synchronously play a cutscene of the game; a first moment is determined based on the first indication information, the first moment being a moment at which the cutscene starts to be played on the first client; and the cutscene starts to be synchronously played with the second client in a case in which the time on the first client reaches the first moment. The cutscene of the first client and the second client in the game is synchronously played, so that game progresses can maintain consistency, and the technical problem of inconsistent game progresses caused by playing a cutscene can be resolved, to achieve the technical effect of maintaining consistent game progresses.

In the technical solutions in this embodiment of this application, the server triggers a cutscene task to a client by using a task system, the client performs the cutscene task and after a stipulated time, the server instructs the client again to convert a state of a scenario NPC object to change scenario collision information. Meanwhile, according to information configured for an NPC, the server changes physical collision information of a scenario loaded by the server, so that scenario physical information of the server maintains consistency with that of the client. The preset NPCs in the task system and the scenario are configured by the client and guided to the server, and the server reads the configuration, triggers corresponding tasks one by one according to task conditions, and synchronizes the tasks to the client for performance.

Optionally, the first obtaining unit is further configured to: obtain a timestamp carried in the first indication information and a second moment indicated by the first indication information, where the timestamp is a moment indicated by the clock system of the server when the server transmits the first indication information to the first client, the second moment is a moment at which the cutscene starts to be played according to the clock system of the server, the timestamp and the second moment are used for obtaining a play moment of the cutscene in the first client, and the timestamp and the second moment are further used for obtaining a play moment of the cutscene in the second client, so that the cutscene is synchronously played on the first client and the second client.

Optionally, the determining unit may include: a determining module, configured to: determine a time difference between a clock system of the first client and the clock system of the server according to the timestamp carried in the first indication information, where the timestamp is a moment indicated by a clock system of a server when the server transmits the first indication information to the first client; and use a sum of the second moment indicated by the first indication information and the time difference as the first moment, where the second moment is a moment at which the cutscene starts to be played according to the clock system of the server.

The determining module is further configured to: obtain a network delay time for transmitting the first indication information in the server and the first client, where the network delay time is a difference between the timestamp carried in the first indication information and the moment indicated by the clock system of the server when the first client receives the first indication information; obtain a timestamp difference between the server and the first client, where the timestamp difference is a difference between the timestamp carried in the first indication information and the moment indicated by the clock system of the first client when the first client receives the first indication information; and set a sum of the network delay time and the timestamp difference as the time difference between the clock system of the first client and the clock system of the server.

Optionally, the apparatus in this embodiment of this application may further include a fifth synchronization unit, configured to: obtain second indication information on the first client, where the second indication information is used for indicating a play progress of the cutscene; and play the cutscene in the first client according to the play progress indicated by the second indication information in a case in which a play progress of the first client for the cutscene is different from the play progress indicated by the second indication information.

Optionally, the apparatus in this embodiment of this application may further include a sixth synchronization unit, configured to: obtain third indication information on the first client, where the third indication information is used for indicating synchronous display of target content in the first client and the second client, and the target content is used for representing a process in which an NPC in the game changes; and synchronously display the target content in the first client with the second client in response to the third indication information.

The sixth synchronization unit is further configured to: obtain a time difference between a clock system of the first client and the clock system of the server, and obtain a third moment indicated by the third indication information, where the third moment is a moment at which the target content is displayed according to the clock system of the server; and obtain a sum of the third moment and the time difference as a fourth moment; and start to synchronously display the target content with the second client in a case in which the clock system of the first client reaches the fourth moment.

Optionally, the sixth synchronization unit is further configured to: display the target content in the cutscene in a case in which the fourth moment is not later than a fifth moment, where the fifth moment is a moment at which the first client ends playing the cutscene; and display the target content in a game screen of the game in a case in which the fourth moment is later than the fifth moment.

By using the foregoing embodiment of this application, the synchronization of the cutscene, and the NPC logical control function are implemented, and all players in the same scenario can change the terrain in time synchronously during the cutscene, thereby greatly enriching the content of the game. When a plurality of players are in the same PVE storyline level, after a key task is triggered, the server instructs all clients to play a cutscene with a storyline, and change the current scenario terrain simultaneously after a period of time, thereby enhancing the immersion and game experience of the players.

According to an embodiment of this application, an apparatus for synchronously playing an animation configured to implement the method for synchronously playing an animation is further provided. The apparatus may be applied to a server. The apparatus includes one or more processors and one or more memories storing program units. The program units are executed by the processor, and the program units include: a second obtaining unit 11 and a second synchronization unit 13.

The second obtaining unit 11 is configured to obtain first indication information, the first indication information being used for indicating a first client and a second client that participate in a game to synchronously play a cutscene of the game.

The second synchronization unit 13 is configured to transmit the first indication information to the first client and the second client, to indicate the first client to start to synchronously play the cutscene with the second client in a case in which the time on the first client reaches a first moment, the first moment being a moment at which the cutscene starts to be synchronously played on the first client with the second client and that is determined by the first client based on the first indication information.

Optionally, the apparatus may further include: a third synchronization unit, configured to: transmit second indication information to the first client and the second client after transmitting the first indication information to the first client and the second client, where the second indication information is used for indicating a play progress of the cutscene; and play the cutscene in the first client and/or second client according to the play progress indicated by the second indication information in a case in which a play progress of the first client and/or the second client for the cutscene is different from the play progress indicated by the second indication information.

Optionally, the apparatus may further include: a fourth synchronization unit, configured to: transmit third indication information to the first client and the second client after transmitting the first indication information to the first client and the second client, where the third indication information is used for indicating synchronous display of target content in the first client and the second client, and the target content is used for representing a process in which an NPC changes in a game.

Examples and application scenarios implemented by the foregoing modules and corresponding steps are the same but are not limited to the content disclosed in the foregoing embodiments. The foregoing modules may be run in the hardware environment shown in FIG. 1 as a part of the apparatus, and may be implemented through software, or may be implemented through hardware. The hardware environment includes a network environment.

According to an embodiment of this application, an electronic apparatus configured to implement the method for synchronously playing an animation is further provided. The electronic apparatus may be a server or a terminal.

Figure 11:
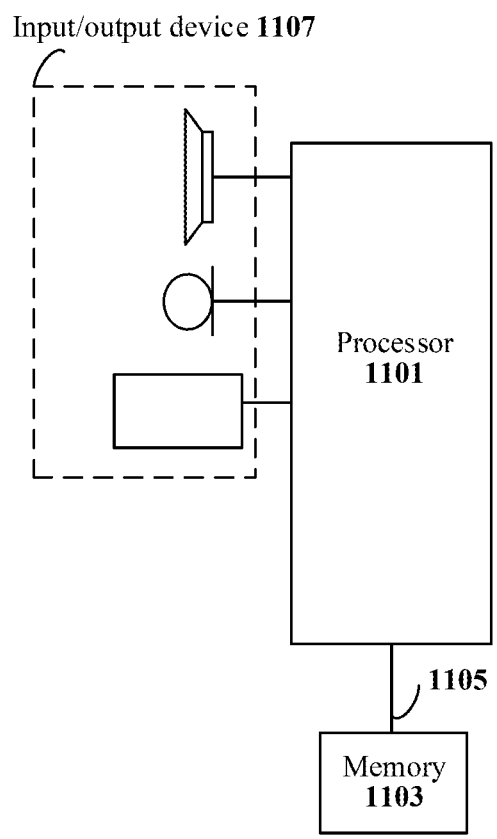
FIG. 11 is a structural block diagram of an electronic apparatus according to an embodiment of this application.

FIG. 11 is a structural block diagram of an electronic apparatus according to an embodiment of this application. The electronic apparatus may be a server or a terminal. The electronic apparatus being a terminal is used as an example for description. As shown in FIG. 11, the terminal may include: one or more (one only is shown in FIG. 11) processors (or processing circuitry) 1101, a memory 1103, and a transmission apparatus 1105 (such as the transmission apparatus in the foregoing embodiments). As shown in FIG. 11, the terminal may further include an input/output device 1107.

The memory 1103 may be configured to store a software program and a module, for example, a program instruction/module corresponding to a method and an apparatus for synchronously playing an animation in the embodiments of this application. The processor 1101 performs various functional applications and data processing by running the software program and the module stored in the memory 1103, that is, implementing the foregoing method for synchronously playing an animation. The memory 1103 may include a high-speed random memory, and may also include a nonvolatile memory such as one or more magnetic storage apparatuses, a flash memory, or another nonvolatile solid-state memory. In some examples, the memory 1103 may further include memories remotely disposed relative to the processor 1101, and these remote memories may be connected to the terminal through a network. Examples of the network include, but are not limited to, the Internet, an intranet, a local area network, a mobile communications network, and a combination thereof.

The transmission apparatus 1105 is configured to receive or transmit data through a network, and may further be used for data transmission between the processor and the memory. Specific examples of the foregoing network may include a wired network and a wireless network. In an embodiment, the transmission apparatus 1105 includes a network interface controller (NIC) that may be connected to another network device and a router by using a network cable, thereby communicating with the Internet or a local area network. In an example, the transmission apparatus 1105 is a radio frequency (RF) module, and is configured to wirelessly communicate with the Internet.

Specifically, the memory 1103 is configured to store an application program.

The processor 1101 may invoke, by using the transmission apparatus 1105, the application program stored in the memory 1103, so as to perform the following steps:

obtaining first indication information on a first client, the first indication information being used for indicating to the first client and a second client that participate in a game to synchronously play a cutscene of the game;

determining a first moment based on the first indication information, the first moment being a moment at which the cutscene starts to be played on the first client; and starting to synchronously play the cutscene with the second client in a case in which the time on the first client reaches the first moment.

The processor 1101 is further configured to perform the following steps:

obtaining first indication information, the first indication information being used for indicating to a first client and a second client that participate in a game to synchronously play a cutscene of the game; and transmitting the first indication information to the first client and the second client, to indicate to the first client to start to synchronously play the cutscene with the second client in a case in which the time on the first client reaches a first moment, the first moment being a moment at which the cutscene starts to be synchronously played on the first client with the second client and that is determined by the first client based on the first indication information.

By using the embodiments of this application, first indication information is obtained on a first client, the first indication information being used for indicating the first client and a second client that participate in a game to synchronously play a cutscene of the game; a first moment is determined based on the first indication information, the first moment being a moment at which the cutscene starts to be played on the first client; and the cutscene starts to be synchronously played with the second client in a case in which the time on the first client reaches the first moment. The cutscene of the first client and the second client in the game is synchronously played, so that game progresses can maintain consistency, and the technical problem of inconsistent game progresses caused by playing a cutscene can be resolved, to achieve the technical effect of maintaining consistent game progresses.

Optionally, reference may be made to the examples described in the foregoing embodiments for specific examples in this embodiment. Details are not described in this embodiment.

A person of ordinary skill in the art may understand that, the structure shown in FIG. 11 is only an exemplary schematic. The terminal may be a terminal device such as a smartphone (such as an Android mobile phone or an iOS mobile phone), a tablet computer, a palmtop computer, a mobile Internet device (MID), or a PAD. FIG. 11 is not intended to limit the structure of the foregoing electronic apparatus. For example, the terminal may further include more or less components (such as a network interface and a display apparatus) than those shown in FIG. 11, or has a configuration different from that shown in FIG. 11.

A person of ordinary skill in the art may understand that all or some of the steps of the methods of the foregoing embodiments may be implemented by a program instructing relevant hardware of the terminal device. The program may be stored in a computer readable storage medium. The storage medium may be non-transitory computer-readable storage medium such as a flash disk, a read-only memory (ROM), a random access memory (RAM), a magnetic disk, or an optical disc.

An embodiment of this application further provides a storage medium. Optionally, in this embodiment, the foregoing storage medium may be configured to execute program code in a method for synchronously playing an animation.

Optionally, in this embodiment, the storage medium may be located in at least one of a plurality of network devices in the network shown in the foregoing embodiments.

Optionally, in this embodiment, the storage medium is configured to store program code for performing the following steps:

(1) Obtain first indication information on a first client, the first indication information being used for indicating the first client and a second client that participate in a game to synchronously play a cutscene of the game.

(2) Determine a first moment based on the first indication information, the first moment being a moment at which the cutscene starts to be played on the first client.

(3) Start to synchronously play the cutscene with the second client when the time on the first client reaches the first moment.

Optionally, the storage medium is further configured to store program code used for performing the following steps:

(1) Obtain first indication information, the first indication information being used for indicating a first client and a second client that participate in a game to synchronously play a cutscene of the game.

(2) Transmit the first indication information to the first client and the second client, to indicate to the first client to start to synchronously play the cutscene with the second client in a case in which the time on the first client reaches a first moment, the first moment being a moment at which the cutscene starts to be synchronously played on the first client with the second client and that is determined by the first client based on the first indication information.

Optionally, reference may be made to the examples described in the foregoing embodiments for specific examples in this embodiment. Details are not described in this embodiment.

Optionally, in this embodiment, the storage medium may include, but is not limited to: any medium that can store program code, such as a non-transitory computer-readable medium such as a USB flash drive, a ROM, a RAM, a removable hard disk, a magnetic disk, or an optical disc.

The sequence numbers of the foregoing embodiments of this application are merely for description purposes and do not indicate the preference of the embodiments.

If the integrated units in the foregoing embodiments are implemented in a form of software functional units and are sold or used as an independent product, the units may be stored in a computer readable storage medium. Based on such understanding, embodiments may be implemented in a form of a software product. The computer software product is stored in a storage medium and includes several instructions for instructing one or more computer devices (which may be a personal computer, a server, a network device, or the like) to perform all or some of steps of the methods in the embodiments of this application.

In the foregoing embodiments of this application, descriptions of the embodiments have different emphases, and as for parts that are not described in detail in one embodiment, reference may be made to the relevant descriptions of the other embodiments.

In the several embodiments provided in this application, it is to be understood that the disclosed client may be implemented in other manners. The described apparatus embodiments are merely exemplary. For example, division of the units is merely division of logic functions, and there may be another division manner during actual implementation. For example, multiple units or components may be combined or may be integrated into another system, or some features may be omitted or not be executed. In addition, the displayed or discussed mutual coupling, or direct coupling, or communication connections may be implemented through some interfaces. Indirect coupling or communication connections between the units or modules may be implemented in electronic or other forms.

The units described as separate parts may or may not be physically separate, and the parts displayed as units may or may not be physical units, may be located in one position, or may be distributed on a plurality of network units. Some of or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit. The integrated units may be implemented in a form of hardware or may be implemented in a form of a software functional unit.

The above descriptions are merely exemplary implementations of the embodiments of this application, and a person of ordinary skill in the art can make various improvements and refinements without departing from the spirit of the embodiments of this application. All such modifications and refinements shall also be intended to be covered by the embodiments of this application.

INDUSTRIAL PRACTICABILITY

The cutscene of the first client and the second client in the game is synchronously played, so that game progresses can maintain consistency, and the technical problem of inconsistent game progresses caused by playing a cutscene can be resolved, to achieve the technical effect of maintaining consistent game progresses.

What is claimed is:

1. A method for synchronous playback of a cutscene, the method comprising:
   receiving, by processing circuitry of a first client, first indication information that is provided to the first client and a second client that participate in a game to synchronously playback the cutscene of the game;
   determining, by the processing circuitry, a first time point based on the first indication information, the first time point indicating when the synchronous playback of the cutscene is to start on the first client; and
   starting, by the processing circuitry, the synchronous playback of the cutscene with the second client based on the first time point being determined to be reached, wherein
   the first indication information includes a timestamp and indicates a second time point,
   the timestamp indicates a clock time of a server when the server transmits the first indication information to the first client,
   the second time point indicates when the synchronous playback of the cutscene is to start according to a clock of the server, and
   the determining includes determining the first time point based on the timestamp and the second time point.

2. The method according to claim 1, wherein the determining comprises:
   determining a time difference between a clock of the first client and the clock of the server according to the timestamp included in the first indication information; and
   determining the first time point based on a sum of the second time point indicated by the first indication information and the time difference.

3. The method according to claim 2, wherein the determining comprises:
   obtaining a network delay time for transmitting the first indication information from the server to the first client, the network delay time being a difference between the timestamp included in the first indication information and a clock time of the server when the first client receives the first indication information;
   obtaining a timestamp difference between the server and the first client, the timestamp difference being a difference between the timestamp included in the first indication information and a timestamp of the clock of the first client when the first client receives the first indication information; and setting a sum of the network delay time and the timestamp difference as the time difference between the clock of the first client and the clock of the server.

4. The method according to claim 1, further comprising:

receiving, by the processing circuitry, second indication information after the synchronous playback for the cutscene starts, the second indication information indicating a play progress of the cutscene; and playing, by the processing circuitry, the cutscene according to the play progress indicated by the second indication information based on a play progress of the first client for the cutscene being different from the play progress indicated by the second indication information.

5. A method for synchronous playback of a cutscene, the method comprising:

receiving, by processing circuitry of a first client, first indication information that is provided to the first client and a second client that participate in a game to synchronously playback the cutscene of the game;

determining, by the processing circuitry, a first time point based on the first indication information, the first time point indicating when the synchronous playback of the cutscene is to start on the first client;

starting, by the processing circuitry, the synchronous playback of the cutscene with the second client based on the first time point being determined to be reached;

receiving, by the processing circuitry, third indication information after the synchronous playback of the cutscene starts, the third indication information indicating synchronous display of target content by the first client and the second client, and the target content representing a process in which a Non Player Character (NPC) in the game changes; and synchronously displaying, by the processing circuitry, the target content in the first client with the second client in response to the third indication information.

6. The method according to claim 5, further comprising:

obtaining, by the processing circuitry, a time difference between a clock of the first client and a clock of a server;

determining, by the processing circuitry, a third time point indicated by the third indication information, the third time point indicating when the target content is to be displayed according to the clock of the server; and determining, by the processing circuitry, a sum of the third time point and the time difference as a fourth time point, wherein the synchronously displaying the target content includes starting to synchronously display the target content with the second client based on the clock of the first client reaching the fourth time point.

7. The method according to claim 6, wherein the starting to synchronously display the target content comprises:

displaying the target content in the cutscene based on the fourth time point not being later than a fifth time point, the fifth time point indicating when the first client is to end the synchronous playback of the cutscene; and displaying the target content in a game screen of the game based on the fourth time point being later than the fifth time point.

8. A method for synchronous playback of a cutscene, the method comprising:

determining, by processing circuitry of a server, first indication information, the first indication information indicating a first time point for the synchronous playback of the cutscene of a game;

transmitting, by the processing circuitry, the first indication information to a first client and a second client that participate in the game; and transmitting, by the processing circuitry, third indication information to the first client and the second client, wherein the synchronous playback of the cutscene is started at the first client and the second client based on the first time point indicated by the first indication information, and the third indication information indicates synchronous display of target content in the first client and the second client, and the target content represents a process in which a Non Player Character (NPC) in the game changes.

9. The method according to claim 8, further comprising:

transmitting, by the processing circuitry, second indication information to the first client and the second client, the second indication information indicating a play progress of the cutscene, wherein the cutscene is played back in at least one of the first client or the second client according to the play progress indicated by the second indication information based on a play progress of the at least one of the first client or the second client for the cutscene being different from the play progress indicated by the second indication information.

10. A first client apparatus, comprising:

processing circuitry configured to receive first indication information that is provided to the first client apparatus and a second client apparatus that participate in a game to synchronously playback a cutscene of the game;

determine a first time point based on the first indication information, the first time point indicating when the synchronous playback of the cutscene is to start on the first client apparatus; and start the synchronous playback of the cutscene with the second client apparatus based on the first time point being determined to be reached, wherein the first indication information includes a timestamp and indicates a second time point, the timestamp indicates a clock time of a server when the server transmits the first indication information to the first client apparatus, the second time point indicates when the synchronous playback of the cutscene is to start according to a clock of the server, and the first time point is determined based on the timestamp and the second time point.

11. The first client apparatus according to claim 10, wherein the processing circuitry is configured to determine a time difference between a clock of the first client apparatus and the clock of the server according to the timestamp included in the first indication information; and determine the first time point based on a sum of the second time point indicated by the first indication information and the time difference.

12. The first client apparatus according to claim 11, wherein the processing circuitry is configured to obtain a network delay time for transmitting the first indication information from the server to the first client apparatus, the network delay time being a difference between the timestamp included in the first indication information and a clock time of the server when the first client apparatus receives the first indication information;

obtain a timestamp difference between the server and the first client apparatus, the timestamp difference being a difference between the timestamp included in the first indication information and a timestamp of the clock of the first client apparatus when the first client apparatus receives the first indication information; and set a sum of the network delay time and the timestamp difference as the time difference between the clock of the first client apparatus and the clock of the server.

13. The first client apparatus according to claim 10, wherein the processing circuitry is configured to receive second indication information after the synchronous playback for the cutscene starts, the second indication information indicating a play progress of the cutscene; and play the cutscene according to the play progress indicated by the second indication information based on a play progress of the first client apparatus for the cutscene being different from the play progress indicated by the second indication information.

14. A first client apparatus, comprising:

processing circuitry configured to receive first indication information that is provided to the first client apparatus and a second client apparatus that participate in a game to synchronously playback a cutscene of the game;

determine a first time point based on the first indication information, the first time point indicating when the synchronous playback of the cutscene is to start on the first client apparatus;

start the synchronous playback of the cutscene with the second client apparatus based on the first time point being determined to be reached;

receive third indication information after the synchronous playback of the cutscene starts, the third indication information indicating synchronous display of target content by the first client apparatus and the second client apparatus, and the target content representing a process in which a Non Player Character (NPC) in the game changes; and synchronously display the target content in the first client apparatus with the second client apparatus in response to the third indication information.

15. The first client apparatus according to claim 14, wherein the processing circuitry is configured to obtain a time difference between a clock of the first client apparatus and the clock of the server;

determine a third time point indicated by the third indication information, the third time point indicating when the target content is to be displayed according to the clock of the server;

determine a sum of the third time point and the time difference as a fourth time point; and start to synchronously display the target content with the second client apparatus based on the clock of the first client apparatus reaching the fourth time point.

16. The first client apparatus according to claim 15, wherein the processing circuitry is configured to display the target content in the cutscene based on the fourth time point not being later than a fifth time point, the fifth time point indicating when the first client apparatus is to end the synchronous playback of the cutscene; and display the target content in a game screen of the game based on the fourth time point being later than the fifth time point.

* * * * *